United States Patent Office 3,629,378
Patented Dec. 21, 1971

3,629,378
METHOD OF EXTRACTING TRI-SUBSTITUTED HYDROCARBYL PHOSPHATES
Yutaka Kodama and Tsutomu Kodama, Toyama-shi, and Masao Nakabayashi, Namerikawa-shi, Japan, assignors to Toyama Chemical Co., Ltd., Tokyo, Japan
No Drawing. Filed Sept. 11, 1968, Ser. No. 759,242
Int. Cl. C07f 9/08; C10l 1/26
U.S. Cl. 260—990      5 Claims

ABSTRACT OF THE DISCLOSURE

Selective separation of the tri-substituted hydrocarbyl phosphates only by extraction from an aqueous solution of water-soluble tri-substituted hydrocarbyl phosphates of the formula $(RO)_2P(O)(OR')$ wherein R is an alkyl or alkenyl group having 1 to 3 carbon atoms or said groups substituted by chlorine and R' is an alkyl or alkenyl group having 1 to 4 carbon atoms or said groups substituted by chlorine. The compounds are useful as additives for gasoline, plasticizers for thermoplastic resins and flame retarding agents for rigid polyurethane foam, polyester resin, etc.

---

The present invention relates to a method of selectively separating at high efficiency the tri-substituted hydrocarbyl phosphates only by extraction from an aqueous solution of tri-substituted hydrocarbyl phosphates of the formula $(RO)_2P(O)(OR')$ wherein R is selected from the group consisting of alkyl and alkenyl groups having 1 to 3 carbon atoms and these groups substituted by halogen and R' is selected from the group consisting of alkyl and alkenyl groups having 1 to 4 carbon atoms, i.e. water-soluble phosphates, such as trimethyl phosphate, triethyl phosphate, dimethylethyl phosphate, diethylmethyl phosphate, tri-n-propyl phosphate, dimethylallyl phosphate, diisopropylallyl phosphate, bis-3-chloroethylmethyl phosphate and diethylbutyl phosphate, etc., or from an aqueous mixture of monohydrocarbyl phosphates, dihydrocarbyl phosphates and inorganic salts. These phosphates consisting of lower alkyl and alkenyl groups have the property of dissolving in water at an optional proportion. Tri-substituted hydrocarbyl phosphates are generally synthesized by a reaction between phosphorus oxychloride and alcohols or by a reaction between dihydrocarbylchlorophosphates and alcohols. In this case, di- or mono-hydrocarbyl phosphates are produced as by-products by the action of hydrogen chloride which is formed simultaneously. In order to suppress these side reactions to a minimum, there has been employed a method wherein the hydrogen chloride is neutralized by using sodium carbonate, ammonia and organic amines, etc. as hydrogen chloride-removing agent. However, since the formed chloride dissolves in tri-substituted hydrocarbyl phosphates to a certain extent, it cannot be removed completely by filtering. Further, since the di- or mono-hydrocarbyl phosphates, formed simultaneously as by-products, are very readily soluble in the tri-substituted hydrocarbyl phosphates, it has been impossible to remove the same completely by operations other than distillation. If the mixed solution is distilled, the chlorides dissolved therein precipitate to hamper the distillation operation, and in addition di- or mono-hydrocarbyl phosphates remain as non-volatile matter causing a decomposition of the tri-substituted hydrocarbyl phosphates and thereby reducing the yield and further presenting a cause of the formation of pyrophosphate as shown by the following reaction equation.

$$(RO)_3PO + (RO)_2P(O)OH \rightarrow (RO)_2P(O)O(O)P(OR)_2$$

These are the most serious disadvantages of the conventional method, but as a result of various studies, the present inventors have successfully obviated all of these disadvantages. Namely, the present invention relates to a method of selectively extracting and separating tri-substituted hydrocarbyl phosphates (hereinafter referred to as (I) for simplicity) only from aqueous solutions of (I) or a mixture containing mono- and dihydrocarbyl phosphates thereof by using aliphatic hydrocarbon halides, such as chloroform, dichloromethane, dichloroethane, 1,1,2-trichloroethane and triclene, etc. By employing this method, it has become possible in the preparation of (I) to completely eliminate inorganic salts which are dissolved in (I) to a small extent and to easily separate mono- and dihydrocarbyl phosphates from tri-hydrocarbyl phosphate, which have heretofore been impossible to remove by operations other than distillation. This extracting method is not only useful for the preparation of phosphates (I) but also particularly advantageously used for recovering phosphates (I), after the water-soluble (I) is used for a chemical treatment in the case of using as the reaction solvent, by diluting them with water.

In the preparation of (I) heretofore, a diminution of the yield has been caused by distilling the reaction mixture containing non-volatile matters, such as inorganic salts and mono- or di-hydrocarbyl phosphates, in addition to an excess of a hydrogen chloride-removing agent dissolved in the mixture as above-mentioned. However, by using the method of this invention, (I) can be distilled easily without being accompanied by side reactions because no non-volatile matters are present. Taking trimethyl phosphate as an example, which is most difficult to extract among the tertiary-phosphates (I), the present inventors reviewed its distribution ratio with respect to various solvents. Namely, a solvent, water and trimethyl phosphate were mixed in the volumetric proportion of 2:1:1 and after shaking, the mixture was left to stand for separation. The solvent phase was concentrated and the remaining trimethyl phosphate was weighed. After obtaining the amount of trimethyl phosphate in the water phase by subtracting the value weighed from the amount of original trimethyl phosphate, the distribution ratio was calculated from the equation given below. The results are shown in Table I below.

TABLE I.—EXTRACTING DISTRIBUTION RATIO OF VARIOUS SOLVENTS

| Solvent | f | Solvent | |
|---|---|---|---|
| Chloroform | 1.93 | Carbon tetrachloride | 0.05 |
| Dichloromethane | 1.71 | Benzene | 0.05 |
| Dichloroethane | 0.64 | Petroleum benzine | 0.01 |
| 1,1,2-trichloroethane | 0.61 | Isopropyl ether | Almost 0 |
| Triclene | 0.57 | Methyl orthoformate | Almost 0 |

Extracting Distribution Ratio $f =$ $$\frac{[T.M.P. (g)] \text{Solvent}}{\text{Solvent (ml.)}} \bigg/ \frac{[T.M.P. (g)] \text{Water}}{\text{Water (ml.)}}$$

wherein T.M.P. means trimethyl phosphate.

As is apparent from Table I, the difference between the solvents used in the present invention and other solvents is clear. Namely, ethers, such as ethyl ether and isopropyl ether, aromatic hydrocarbons, such as benzene, and nonpolar carbon tetrachloride, are not suitable for use in the extraction of (I), but aliphatic hydrocarbon halides, such as chloroform, dichloromethane, dichloroethane, 1,1,2-tirchloroethane and Triclene, are suitable for the extraction of the objective compound (I) and particularly chloroform and dichloromethane have excellent extracting ability. When these solvents are used in a large amount for tri-substituted hydrocarbyl phosphates (I), the concentration of (I) in the solvents becomes low but conversely the distribution ratio becomes large. This is probably because in an aqueous solution, several molecules of (I) are associated, while in the solvents the molecules of (I) do not associate as the concentration of (I) is reduced. As an example, the distribution ratios of various amounts of solvents with respect to trimethyl phosphate, as obtained in the same manner as described previously, are shown in Table II.

TABLE II.—CHANGE IN DISTRIBUTION RATIO IN VARIOUS SOLVENTS
[T.M.P. 5 ml./water 5 ml.]

| | Solvent, volume ratio | | | |
|---|---|---|---|---|
| | Chloroform | Dichloromethane | Dichloroethane | Carbon Tetrachloride |
| 1 | 1.25 | 0.98 | 0.57 | 0.04 |
| 2 | 1.93 | 1.72 | 0.64 | 0.05 |
| 3 | 3.09 | 2.63 | 0.73 | 0.10 |

Volume ratio=Solvent (ml.)/water (ml.)

In preparing (I) according to the present invention, for example, dihydrocarbylchlorophosphates and alcohols are reacted with each other using a hydrogen chloride-removing agent. After completion of the reaction, water is added to the reaction mixture to dissolve the chloride formed and then an aliphatic hydrocarbon halide, such as chloroform, is added, whereby the distribution ratio becomes greater due to the chloride dissolved in the aqueous solution and thus the objective compound (I) only can be extracted very easily. In this case, by using a solvent in an amount 2 to 5 times by volume the amount of (I) produced, tri-substituted hydrocarbyl phosphates (I) can be extracted substantially entirely in one step, and can be extracted completely from the mixture by the re-extraction with same amount of the solvent as or an amount of solvent ½ to ⅓ times the amount used initially. After the extraction and separation, to solvent is recovered and the remaining is distilled, whereby the end product can be distilled out easily with no residue. In this case, the solvent can be recovered quantitatively since it can be distilled out under normal pressure. Further, in preparing dihydrocarbyl phosphates using tri-substituted hydrocarbyl phosphates as the starting material, a predetermined quantity of hydrogen chloride is passed through the tri-substituted hydrocarbyl phosphates to form dihydrocarbyl phosphates and thereafter the reaction liquid is dissolved in water. The unreacted tri-substituted hydrocarbyl phosphates can be extracted and separated completely by using the solvents usable in the present invention, while pure dihydrocarbyl phosphates can be obtained from the water phase.

EXAMPLE 1

Preparation and extraction of trimethyl phosphate 4.1 g. (0.125 mol) of caustic soda were dissolved in 16.0 g. (0.5 mol) of methyl alcohol. Using the solution as a hydrogen chloride-removing agent, 14.5 g. (0.1 mol) of dimethylchlorophosphate were dropped for reaction while maintaining the reaction temperature at from 0 to 5° C. Upon completion of the reaction, 50 ml. of water were added to dissolve the sodium chloride formed and then 60 ml .of chloroform were added to extract the trimethyl phosphate for separation. After recovering the chloroform by distilling the chloroform phase under normal pressure, the remaining phase was distilled under reduced pressure, whereby 12.8 g. of trimethyl phosphate having a boiling point of 83 to 85° C./20 mm. Hg was obtained. The yield was 92.0%. The amount of chloroform recovered was 58.8 ml. and the recovery percentage was 98.0%.

EXAMPLE 2

Recovery of trimethyl phosphate and preparation of dimethyl phosphate 6.8 g. (0.18 mol) of hydrogen chloride were passed through 28.0 g. (0.2 mol) of trimethyl phosphate to form dimethyl phosphate. After the reaction, the reaction mixture was dissolved in 80 ml. of water and then extraction was effected with 85 ml. of dichloromethane. The dichloromethane was recovered by distilling the solvent phase under normal pressure and thereafter trimethyl phosphate was recovered by distillation under reduced pressure. On the other hand, by concentrating the water phase, pure dimethyl phosphate having a refractive index of $n_D^{25}$ 1.409 was obtained.

The amount of trimethyl phosphate recovered from dichloromethane—5.6 g. (recovery ratio 20.0%)

The amount of dimethyl phosphate obtained from the water phase—20.2 g. (yield 80.0%)

The amount of dichloromethane recovered—83.7 ml. (recovery ratio 93.5%)

EXAMPLE 3

Recovery of diethyl-β-chloroethyl phosphate and preparation of ethyl-β-chloroethyl phosphate 3.65 g. (0.1 mol) of hydrogen chloride were blown into 43.3 g. (0.2 mol) of diethyl-β-chloroethyl phosphate as a reaction solvent and the starting material, and after stirring at 15 to 20° C. for 1.5 hours, the reaction liquid was added to 80 ml. of water. The unreacted diethyl-β-chloroethyl phosphate was separated by extraction with 100 ml. of dichloromethane and after removing the dichloromethane by distillation, the extract was distilled under reduced pressure. 20.0 g. of diethyl-β-chloroethyl phosphate having a boiling point of 118 to 119° C./4.5 mm. Hg were obtained (recovery ratio 92.1%). By concentrating the aqueous solution, 17.0 g. of ethyl-β-chloroethyl phosphate was obtained.

The conversion of ethyl-β-chloroethyl phosphate 89.9%.

*Elementary Analysis.*—Measured (percent): chlorine, 18.30; phosphorus, 16.01. Calculated (percent): chlorine, 18.83; phosphorus, 16.59.

What is claimed is:

1. A method of selectively separating tri-substituted hydrocarbyl phosphates only from an aqueous solution of water-soluble tri-substituted hydrocarbyl phosphates of the formula (RO)$_2$P(O)(OR') wherein R is selected from the group consisting of alkyl and alkenyl groups having 1 to 3 carbon atoms and said groups substituted by chlorine and R' is selected from the group consisting of alkyl and alkenyl groups having 1 to 4 carbon atoms and said groups substituted by chlorine, by extracting said aqueous solution with an aliphatic hydrocarbon halide selected from the group consisting of chloroform, dichloromethane, dichloroethane, 1,1,2-trichloroethane and triclene.

2. A method according to claim 1 wherein the aliphatic hydrocarbon halide is chloroform or dichloromethane.

3. A method according to claim 1 wherein the tri-substituted hydrocarbyl phosphate is selected from the group consisting of trimethyl phosphate, triethyl phosphate, dimethylethyl phosphate, diethylmethyl phosphate, tri-n-propyl phosphate, dimethylallyl phosphate, diisopropylallyl phosphate, bis-3-chloroethylmethyl phosphate and diethylbutyl phosphate.

4. A method according to claim 1 wherein the amount of aliphatic hydrocarbon halide used is from 2 to 5 times the volume of the tri-substituted hydrocarbyl phosphate.

5. A method according to claim 1 wherein the aliphatic hydrocarbon halide is used in an amount which is twice the volume of the said aqueous solution.

References Cited

UNITED STATES PATENTS 2,059,912   11/1936   Reid _____ 260—990

CHARLES B. PARKER, Primary Examiner

A. H. SUTTO, Assistant Examiner

U.S. Cl. X.R.

44—76, DIG 4; 210—21; 260—30.6 R, 45.7 P, 45.95, 705